US005890132A

United States Patent [19]

Sanders

[11] Patent Number: 5,890,132
[45] Date of Patent: Mar. 30, 1999

[54] ASSOCIATING A PHYSICAL APPLICATION TO A BUSINESS OPERATION

[75] Inventor: Stephen R. Sanders, Celina, Tex.

[73] Assignee: Electronic Data Systems Corporation, Plano, Tex.

[21] Appl. No.: 664,460

[22] Filed: Jun. 14, 1996

[51] Int. Cl.[6] .......... G06F 15/18
[52] U.S. Cl. .......... 705/7; 395/500
[58] Field of Search .......... 395/500; 705/7

[56] References Cited

U.S. PATENT DOCUMENTS

| | | | |
|---|---|---|---|
| 4,918,602 | 4/1990 | Bone et al. | 364/401 |
| 5,550,746 | 8/1996 | Jacobs | 364/479.01 |
| 5,701,400 | 12/1997 | Amado | 395/76 |

*Primary Examiner*—Kevin J. Teska
*Assistant Examiner*—Thuan Do
*Attorney, Agent, or Firm*—Barton E. Showalter; L. Joy Griebenow

[57] ABSTRACT

A system (10) is provided for associating a physical application (22) to a business operation. The system (10) includes a first database (30, 34, 38, 42) operable to store information relating to at least one physical application (22). An interface (46) receives information relating to at least one business requirement (24) of the business operation. A relator (48), which is coupled to the first database (30, 34, 38, 42) and the interface (46), generates linking information (52) to associate the business requirement (24) to the physical application (22). A second database (50) is coupled to the relator (48). The second database (50) stores the business requirement information and the corresponding linking information (52) to associate the physical application (22) to the business operation.

19 Claims, 4 Drawing Sheets

ANALYSIS REPORT

| BUSINESS REQUIREMENT (110) | CORE PROCESS SUPPORT FUNCTION/LOGICAL APPLICATION (112) | INFORMATION TYPE (114) | TECHNICAL SPECIFICATION (116) | PHYSICAL APPLICATION (118) |
|---|---|---|---|---|
| BUSINESS REQUIREMENT ONE | FINANCE/LOGICAL APPLICATION ONE | INFORMATION TYPE ONE | TECHNICAL SPEC ONE | PHYSICAL APPLICATION ONE |
| BUSINESS REQUIREMENT TWO | ENGINEERING/LOGICAL APPLICATION THREE | INFORMATION TYPE TWO<br>INFORMATION TYPE FOUR | TECHNICAL SPEC THREE | PHYSICAL APPLICATION TWO<br>PHYSICAL APPLICATION THREE |
| BUSINESS REQUIREMENT THREE | FINANCE/LOGICAL APPLICATION ONE | | | |
| BUSINESS REQUIREMENT FOUR | FINANCE/LOGICAL APPLICATION FOUR | INFORMATION TYPE ONE | TECHNICAL SPEC ONE<br>TECHNICAL SPEC FOUR | PHYSICAL APPLICATION ONE<br>PHYSICAL APPLICATION TWO<br>PHYSICAL APPLICATION FOUR |
| BUSINESS REQUIREMENT FIVE | CUSTOMER CARE/LOGICAL APPLICATION TWO | INFORMATION TYPE TWO | TECHNICAL SPEC TWO | PHYSICAL APPLICATION FIVE |
| BUSINESS REQUIREMENT SIX | MARKETING/LOGICAL APPLICATION SEVEN | INFORMATION TYPE THREE<br>INFORMATION TYPE ONE | TECHNICAL SPEC ONE | PHYSICAL APPLICATION TWO<br>PHYSICAL APPLICATION FIVE |
| BUSINESS REQUIREMENT SEVEN | ENGINEERING/LOGICAL APPLICATION FIVE | INFORMATION TYPE FOUR | TECHNICAL SPEC TWO<br>TECHNICAL SPEC THREE | PHYSICAL APPLICATION THREE |
| BUSINESS REQUIREMENT EIGHT | MARKETING/LOGICAL APPLICATION SEVEN | | | |

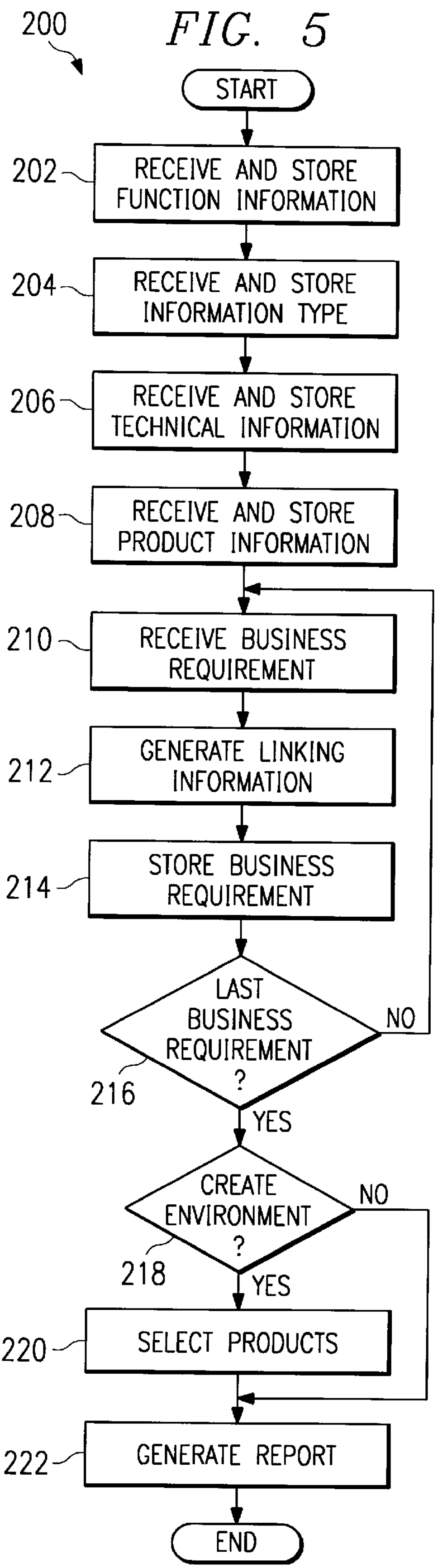
200
FIG. 5
START
202
RECEIVE AND STORE FUNCTION INFORMATION
204
RECEIVE AND STORE INFORMATION TYPE
206
RECEIVE AND STORE TECHNICAL INFORMATION
208
RECEIVE AND STORE PRODUCT INFORMATION
210
RECEIVE BUSINESS REQUIREMENT
212
GENERATE LINKING INFORMATION
214
STORE BUSINESS REQUIREMENT
LAST BUSINESS REQUIREMENT ?
216
NO
YES
CREATE ENVIRONMENT ?
218
NO
YES
220
SELECT PRODUCTS
222
GENERATE REPORT
END

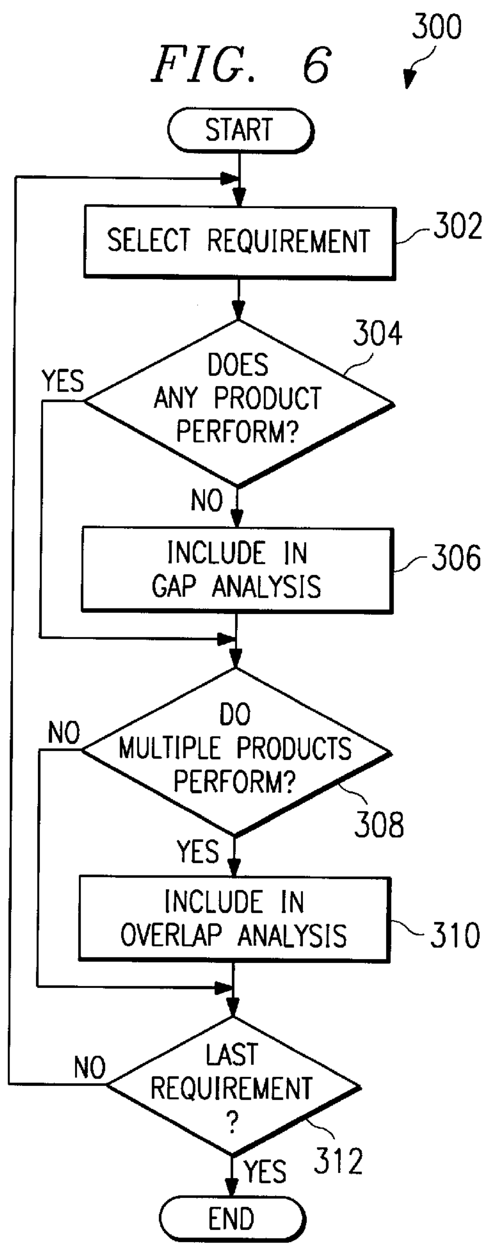
FIG. 6
300
START
SELECT REQUIREMENT
302
DOES ANY PRODUCT PERFORM?
304
YES
NO
INCLUDE IN GAP ANALYSIS
306
DO MULTIPLE PRODUCTS PERFORM?
308
NO
YES
INCLUDE IN OVERLAP ANALYSIS
310
LAST REQUIREMENT ?
312
NO
YES
END

ASSOCIATING A PHYSICAL APPLICATION TO A BUSINESS OPERATION

TECHNICAL FIELD OF THE INVENTION

This invention relates in general to the field of evaluation systems, and more specifically to associating a physical application to a business operation.

BACKGROUND OF THE INVENTION

To operate any business, a number of functions must be performed either manually or by a machine. In many cases, these functions can be automated in a computing environment developed from existing products or physical applications, such as commercially-available software.

A business attempts to match its functional requirements to the functions performed by existing physical applications. In particular, a business develops computing environments from existing physical applications which were designed to perform certain functions. Often the business selects physical applications and operates in accordance with the functions performed by the selected physical applications, even though these functions are not necessarily the same as the functions actually required in the business operation. Without a clear understanding of business requirements and existing physical applications, the functions provided by the selected physical applications may overlap, thereby introducing unnecessary redundancy and complexity in the computing environment. Also, businesses may fail to identify and automate many functions because the appropriate physical applications were not selected.

SUMMARY OF THE INVENTION

In accordance with the present invention, the disadvantages and problems associated with automating functions in a business operation have been substantially reduced or eliminated.

In accordance with one embodiment of the present invention, a system is provided for associating a physical application to a business operation. The system includes a first database operable to store information relating to at least one physical application. An interface receives information relating to at least one business requirement of the business operation. A relator, which is coupled to the first database and the interface, generates linking information to associate the business requirement to the physical application. A second database is coupled to the relator. The second database stores the business requirement information and the corresponding linking information to associate the physical application to the business operation.

In accordance with another embodiment of the present invention, a method is provided for associating at least one physical application to a business operation. The method includes receiving and storing information for the physical application. Information relating to at least one business requirement of the business operation is received. Linking information that associates the business requirement to the physical application is generated. The business requirement information and corresponding linking information to associate the physical application to the business operation is stored.

In accordance with yet another embodiment of the present invention, a data structure is provided for defining a business operation. The data structure includes a first memory which stores information relating to at least one physical application and at least one function to be performed in the business operation. A second memory stores information relating to at least one business requirement and also linking information that associates the business requirement to the function and the physical application.

A technical advantage of the present invention includes representing a business operation with a data structure having information relating to a number of objects, including core process support functions, logical applications, information types, technical specifications, technology policies, physical applications, and business requirements of the business operation. The core process support functions and logical applications provide a hierarchical order to the business requirements in a business operation. Specifically, related business requirements are grouped into a logical application, and related logical applications are grouped into a core process support function. Information operated on, manipulated by, or used in a business operation can be consistently defined by information types, thus allowing the information to be made commonly available for use in the business operation. The technology policies and technical specifications provide a consistent and organized way to define technical features that may be desirable for physical applications used in the business operation. Throughout this description, the terms "core process support function," "logical application," "information type," "technical specification," "technology policy," "physical application," and "business requirement" will be used to refer to both the objects and the information representing the objects.

Another technical advantage of the present invention includes providing a system and method which link one or more business requirements of a business operation with associated core process support functions, logical applications, information types, technical specifications, technology policies, and physical applications. Because the business requirements may each be linked to one or more information types, the system and method can identify the business requirements which operate or manipulate the same information. Consequently, information that is used by two or more business requirements can be made commonly available. In addition, because each business requirement can be linked to one or more physical applications, the system and method identify redundancy between physical applications. Furthermore, the system and method can identify which business requirements are not performed by any physical application.

Yet another important technical advantage of the present invention includes providing a graphical user interface (GUI) that facilitates the inputting, relating, modification, and viewing of information. The GUI may include pull-down menus of predetermined names for the core process support functions, logical applications, information types, technology policies, technical specifications, and physical applications associated with a business operation. Because various users are constrained to select only from the predetermined names, the objects represented by the names are consistently defined.

Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 4 illustrates an exemplary analysis report generated by the system shown in FIG. 2;

FIG. 5 is a flow chart of a method for associating a physical application to a business operation; and FIG. 6 is a flow chart of a method for comparing physical applications with business requirements.

DETAILED DESCRIPTION OF THE INVENTION

Figure 1:
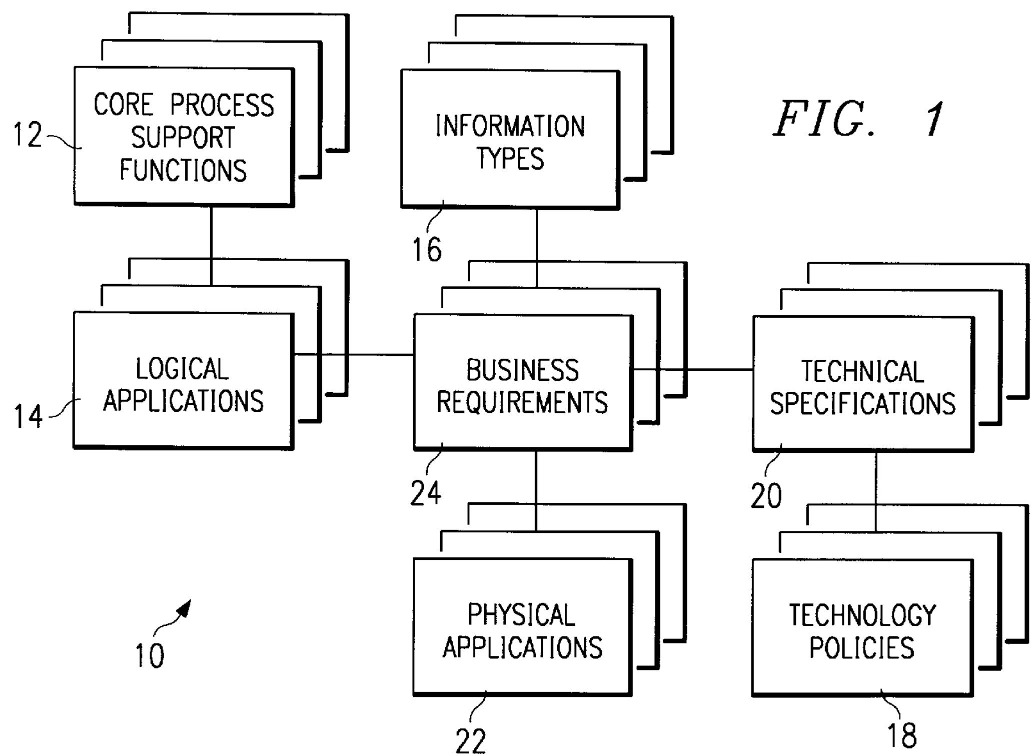
FIG. 1 illustrates a data structure to associate a physical application to a business operation.

FIG. 1 illustrates a data structure 10 which defines certain aspects of a business operation. Data structure 10 can be used to associate one or more physical applications 22 to the business operation. Data structure 10 includes various kinds of information, including information relating to one or more core process support functions 12, logical applications 14, information types 16, technology policies 18, technical specifications 20, physical applications 22, and business requirements 24.

As shown in FIG. 1, all information in data structure 10 can be related by business requirements 24. Each business requirement 24 represents an actual function performed by an entity, such as a company, in the course of business. These business requirements 24 may include both automated and traditionally manual functions. For example, one business requirement 24 may specify the production of a general ledger within three business days after the close of a month. Another business requirement may specify that at least 5,000 customer accounts must be supported. These business requirements can be automated to a large degree. Another business requirement 24 may comprise the stuffing of envelopes for mailing. In contrast to the other two exemplary business requirements, this third business requirement is typically performed by a person. In one embodiment, business requirements 24 can be ordered in a hierarchy. For example, one or more low level business requirements may be grouped under a high level or "parent" business requirement.

Each core process support function 12 represents an area of operation in which one or more business requirements 24 are performed. Such core process support functions may include billing, financial reporting, engineering support, program development, software development, marketing, sales, customer service, and any other suitable core process support function. Core process support functions 12 provide an organization or framework for defining high level functions of a business operation.

One or more logical applications 14 are related to each core process support function 12. Logical applications 14 represent the actual functions performed within each core process support function 12. For example, in a core process support function 12 of finance, logical applications 14 may include cash management, customized financial management reports, employee retirement fund management, enterprise economic analysis, generally accepted accounting principles (GAAP) reports, and general ledger. Likewise, in a core process support function 12 of software development, logical applications 14 may include problem identification, code generation, and software testing. Each logical application 14 may include a grouping of related business requirements 24.

Each information type 16 represents a type of information that may be operated on, manipulated by, or used in performing one or more business requirements 24. Information types 16 define, identify, organize, and manage the information typically maintained by a business and used by physical applications 22 to perform business requirements 24. Exemplary information types 16 can include account information, asset information, contract information, customer information, and debt information.

Each technology policy 18 represents a preferred type of technology that can be used to perform one or more business requirements 24. For example, a technology policy 18 may specify that the communications protocol should be TCP/IP, that all work stations be IBM compatible, and that all databases used in the business operation support a particular standard. Likewise, a technology policy 18 may specify a particular transfer control protocol or Internet protocol. Generally, technology policies 18 provide broad guidelines for selecting physical applications 22, thereby providing numerous advantages, such as ensuring the compatibility of various physical applications 22 and the conformance of physical applications 22 with user preferences.

A technical specification 20 represents a technical requirement that is desirable when performing a business requirement 24. For example, technical specification 20 may specify particular technical details concerning the TCP/IP communications protocol, particular capabilities of an IBM compatible work station (memory, hard disk space, processor, etc.), and particular capabilities and capacities of a database program. Each technical specification 20 is business requirement specific. More than one technical specification 20 can be specified for each business requirement 24, and typically the technical specification 20 will provide a greater level of detail consistent with technology policy 18. The technical specifications 20, in conjunction with technology policies 18, define and deliver the appropriate and detailed specifications of physical applications 22 for supporting the business requirements 24. However, technology policies 18 and technical specifications 20 are preferably not specific to any physical applications 22.

Each physical application 22 represents a hardware or software product that can be used to perform one or more business requirements 24. Physical applications 22 may operate on, manipulate, store, or process information falling within one or more information types 16. Each physical application 22 can be a particular type of technology specified in technology policy 18 that meets specific technical requirements defined by technical specifications 20. Examples of hardware physical applications 22 may include specific models of work stations, file servers, mass storage memory systems, and disk drives. Exemplary software physical applications 22 include specific versions or releases of word processing software, accounting software, tracking software, graphics software, and production software.

Figure 2:
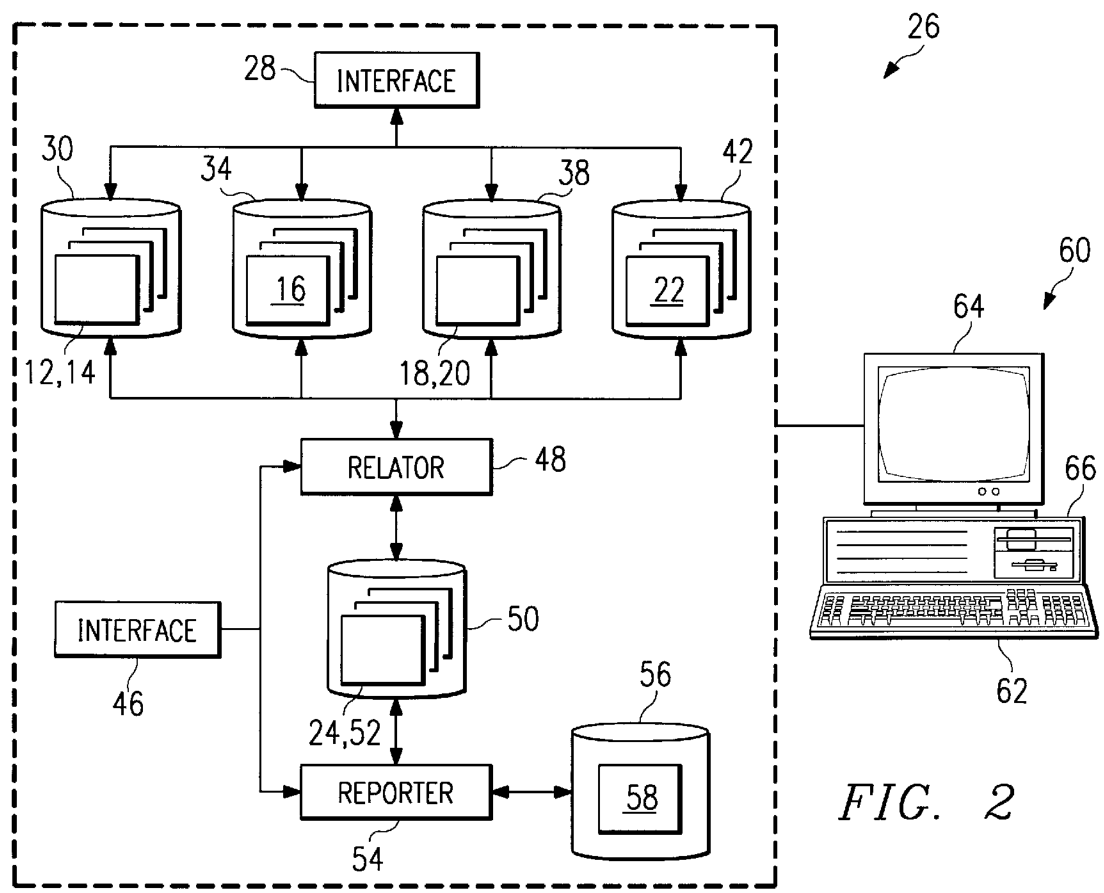
FIG. 2 illustrates a system for associating a physical application to a business operation, according to an embodiment of the present invention.

FIG. 2 illustrates a system 26 for associating a physical application 22 to a business operation. System 26 may function to generate, modify, and maintain data structure 10 shown in FIG. 1. System 26 includes a first interface 28 which allows interaction with the system. First interface 28 may include one or more suitable input devices, such as a keypad, touch screen, or other suitable device that can accept information, and one or more suitable output devices, such as a computer display, for conveying information associated with the operation of system 26. First interface 28 receives information related to core process support functions 12, logical applications 14, information types 16, technology policies 18, technical specifications 20, and physical applications 22. The present invention contemplates that a high level user, such as an informational manager or administrator, may use first interface 28 to input this information, thereby configuring or "setting up" system 26, as explained below, for use by other users, such as one or more users who enter business requirements 22.

One or more memories, which can be coupled to first interface 28, function to store the information received at first interface 28. These memories may include function memory 30, information type memory 34, technical memory 38, and product memory 42. Each of these memories 30, 34, 38, and 42 can reside in the same or separate suitable storage media, such as random access memory (RAM), read only memory (ROM), disk, tape storage, or other suitable volatile or non-volatile memory. Each memory can also be a relational database.

Function memory 30 receives and stores information relating to core process support functions 12 and corresponding logical applications 14 shown in FIG. 1. For each core process support function 12, the information contained in function memory 30 may specify a name for core process support function 12, a textual description, and related logical applications 14. The information may also include a name and textual description for each logical application 14.

Information type memory 34 receives and stores information relating to different information types 16 described with reference to FIG. 1. For each information type 16, the information contained in memory 34 may specify a name for information type 16, a textual description, and a specification of the structure and content of information type 16.

Technical memory 38 receives and stores information relating to technology policies 18. This information may comprise information specifying names, descriptions, and specific details for each technology policy 18.

Product information memory 42 receives and stores information relating to one or more physical applications 22. For each physical application 22, this information may specify the name of physical application 22, the model or version number of physical application 22, the vendor or manufacturer supplying physical application 22, the name of a technical contact for the vendor or manufacturer, a contact telephone number, functional characteristics of physical application 22, an operating system on which physical application 22 will run, and a database management system used by physical application 22.

A second interface 46 also allows interaction with system 26. Like first interface 28, second interface 46 may include one or more suitable input devices, such as a keypad, touch screen, or other suitable device that can accept information, and one or more suitable output devices, such as a computer display, for conveying information associated with the operation of system 26. In one embodiment, users, either human or machine, can use second interface 46 to input additional information into system 26, such as information relating to one or more business requirements 24. For each business requirement 24, this information can include a name of the business requirement, a textual description of the business requirement, a number associated with the business requirement, a date on which information relating to the business requirement was first entered into system 26, a date on which such information was last updated, and a level of priority for the business requirement. In addition, second interface 46 functions to receive instructions for directing other elements in system 26, such as a relator 48 and a reporter 54.

Figure 3:
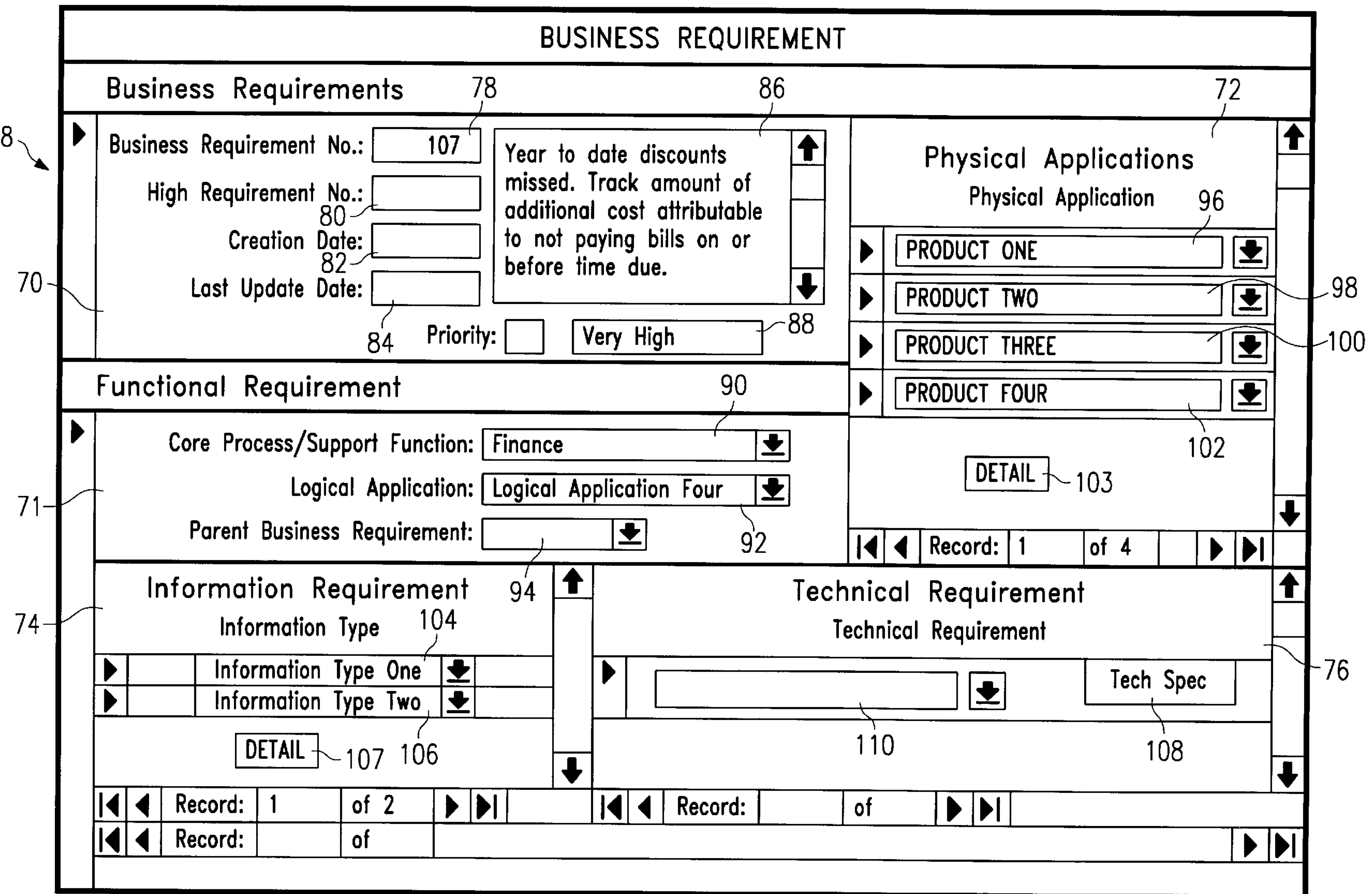
FIG. 3 illustrates an exemplary input screen generated by the system shown in FIG. 2.

Relator 48 is coupled to second interface 46 and each of function memory 30, information type memory 34, technical memory 38, and product memory 42. The functionality of relator 48 may be performed by a processor, such as a main frame, file server, work station, or any other suitable processor running appropriate software. Relator 48 relates a business requirement 24 received at second interface 46 with information concerning core process support functions 12, logical applications 14, information types 16, technology policies 18, technical specifications 20, and physical applications 22 stored in memories 30, 34, 38, and 42. Relator 48 may retrieve information from each of the previously described memories so that each business requirement 24 can be related to a core process support function 12, a logical application 14, at least one information type 16, a technology policy 18, a technical specification 20, and at least one physical application 22 as a system 26 receives business requirement 24. An exemplary information screen for entering business requirements 24 is illustrated in FIG. 3. In order to relate the information, relator 48 may generate one or more pointers, indices, or similar linking information 52 between business requirements 24 and the other information.

A requirements memory 50 is coupled to relator 48. Like memories 30, 34, 38, and 42, requirements memory 50 can reside in a suitable storage medium, such as RAM, ROM, disk, tape storage, or other suitable volatile or non-volatile memory. In one embodiment, requirements memory 50 resides in the same database as memories 30, 34, 38, and 42. Requirements memory 50 receives and stores business requirements 24 from relator 48. Requirements memory 50 may also function to store the pointers, indices, or similar linking information 52 generated by relator 48. Consequently, each record in requirements memory 50 comprises a business requirement 24 with appropriate linking information 52 to an associated core process support function 12, logical application 14, information types 16, technology policies 18, technical specifications 20, and physical applications 22 to support the business requirement.

A reporter 54 is coupled to second interface 46 and requirements memory 50. The functionality of reporter 54 may be performed by a processor, such as a mainframe, a file server, a workstation, or any other suitable processor running appropriate software. A user of system 26, via second interface 46, can direct reporter 54 to generate environment information 58 using information retrieved from product memory 42 and requirements memory 50. An environment memory 56, which is coupled to reporter 54, stores the environment information 58 generated by reporter 54. Environment memory 56 can reside in a suitable storage medium, such as RAM, ROM, disk, tape storage, or other suitable volatile or non-volatile memory.

Environment information 58 may comprise information relating to a hypothetical computing environment created from one or more physical applications 22 specified in product memory 42 and linked to business requirements 24 by relator 48. In addition, reporter 54 determines which business requirements 24 are not performed by a computing environment specified in environment information 58. Reporter 54 may also determine which business requirements 24 are performed by more than one physical application 22 in a computing environment. Consequently, reporter 54 can identify both gaps and redundancies of functionality within a computing environment. Reporter 54 also generates reports, such as the exemplary analysis report table 108 shown in FIG. 4, which can be useful in assessing the suitability of a physical application 22 for a business operation. Preferably, a user of system 26 specifies the format of these reports, as explained below in more detail.

System 26 may operate on one or more computers, shown generally as computer 60. Computer 60 maintains and executes the instructions to associate a physical application 22 to a business operation. Computer 60 includes an input device 62 such as a keypad, touch screen, or other device that can accept information. An output device 64 conveys information associated with the operation of system 26, including digital data, visual information, or audio information. Both input device 62 and output device 64 may include fixed or removable storage media, such as magnetic computer disk, optical disk, CD-ROM, or other suitable media to both receive output from and provide input to system 26. One or more processors 66 and their associated memories execute instructions and manipulate information in accordance with the operation of system 26 described herein.

In operation, one or more core process support functions 12, logical applications 14, information types 16, technology policies 18, technical specifications 20, and physical applications 22 can be named, specified, defined, and input at first interface 28 by high level users, such as informational managers or administrators. This information is stored in the appropriate memory 30, 34, 38, or 42. At this point, system 26 is set up to receive business requirements 24. Various users can then input information for one or more business requirements 24 at second interface 46 and relate input business requirements 24 to the other information using relator 48. As described below in more detail with reference to FIG. 3, the input and relating of business requirements 24 by users can be driven by the information input by the high level users. In particular, the users may be constrained to the selections, nomenclature, or structure established by the high level users. Consequently, system 26 defines and operates consistently on objects such as core process support functions 12, logical applications 14, information types 16, technology policies 18, technical specifications 20, and physical applications 22. After the information has been entered by both levels of users, reporter 54 can be used to analyze and report upon the information.

FIG. 3 illustrates an exemplary information screen 68 generated by system 26 shown in FIG. 2. Information screen 68, which may be a graphical user interface (GUI), can be used to input, view, or modify information relating to a particular business requirement 24. Information screen 68 may include input or viewing sections including business requirement section 70, functional requirement section 71, physical application section 72, information requirement section 74, and technical requirement section 76. Each of these sections includes one or more fields for viewing, inputting, selecting, or modifying information. At least a portion of these fields can be implemented as pull-down menus which present a user with a selection list for inputting information. The pull-down menus can be driven by information stored in function memory 30, information type memory 34, technical memory 38, and product memory 42. Other fields may require that information be input by keying or typing. Still other fields can be configured to default to a predetermined default item. Other fields can be managed by system 26.

Business requirement section 70 includes input fields for identifying a business requirement 24. These fields may include a business requirement number field 78, a high requirement number field 80, a creation date field 82, a last update field 84, a description field 86, and a priority field 88.

A business requirement number associated with the particular business requirement 24 can be viewed or entered into business requirement number field 78. A user can input the number by typing, or system 26 can automatically create the number as a user or users of system 26 enter multiple business requirements 24. Once the other information relating to one or more business requirements 24 has been entered into system 26, business requirement number field 78 can function as a pull-down menu to present a list of business requirement numbers from which a user can select to modify or view the information corresponding to a particular business requirement number. A user may view or input into high requirement number field 80 a high requirement number which is used to set the order of business requirements 24 input into system 26. Creation date field 82 can be used to view or input the date on which a business requirement 24 is entered into system 26. Creation date field 82 can be configured so when information is input for any new business requirement, creation date field 82 defaults to the current date. A user may view or input into last update field 84 the date on which information relating to a particular business requirement was last updated. In one embodiment, last update field 84 may be configured so that the current date is automatically input whenever an update to the business requirement is made. A description for the particular business requirement 24 can be entered into or viewed in description field 86. In one embodiment, a user may type directly into description field 86 to input the description. A user may view or input into priority field 88 a priority for a business requirement. A particular business requirement's priority specifies how important the business requirement is to the operation of a business. In one embodiment, the choices for priority can be "very high," "high," "medium," or "low."

Functional requirement section 71 includes a core process support function field 90, a logical application field 92, and a parent business requirement field 94. The core process support function 12 and logical application 14 relating to a business requirement 12 can be viewed or entered into core process support function field 90 and logical application field 92, respectively. Each of fields 90 and 92 can be pull-down menus from which a user may select from a list of core process support functions 12 and logical applications 14 specified in the information stored in function memory 30. If the business requirement 24 is a low level business requirement, a high level or "parent" business requirement can be viewed or entered into parent business requirement field 94, which may also be a pull-down menu. Thus, low level business requirements can be grouped with their respective parent business requirements.

Physical application section 72 may comprise one or more product fields, such as a product one field 96, a product two field 98, a product three field 100, and a product four field 102, for viewing or inputting information identifying physical applications 22 that perform an identified business requirement 24. Each of these product fields 96–102 can be a pull-down menu which presents a user of system 26 with a list of physical applications 22 specified by information stored in product memory 42. A user can select a detail button 103 to display details (e.g., manufacturer, distribution, contact, description, or specifications) on a selected physical application 22 in a pop-up window, or the like.

Information requirement section 74 includes one or more information type fields, including an information type one field 104 and an information type two field 106. Each of the information type fields 104 and 106 function to receive or display the types of information operated, manipulated, or used by a business requirement 24. Information type fields 104 and 106 can be pull-down menus, each of which presents a list of all information types 16 specified in information type memory 38. A user can select a detail button 107 to display details (e.g., structure, textual description) on a selected information type 16.

Technical requirement section 76 comprises at least one technical requirement field 78. A technical requirement relating to a particular business requirement 24 can be input or viewed in technical requirement field 78. Technical requirement field 78 can be pull-down menu which presents a user with a list of the technical requirements specified in technical memory 38. A user can select a technical specification button 108 to display details on technology policies 18 and technical specifications 20 associated with technical requirements displayed in technical requirement field 78.

In operation, system 26 presents information screen 68 to a user to input information relating to one or more business requirements 24. A separate information screen 68 may be utilized for each business requirement 24. System 26 associates an input business requirement 24 with information in memories 30, 34, 38, and 42 by receiving information as the user selects from each of the remaining fields appearing on information screen 68 by keying or pull-down menus. The associations established on information screen 68 can be implemented with pointers, indices, or any appropriate linking information 52 previously described. In this manner, information screen 68 allows a user to link or relate each entered business requirement 24 to its corresponding core process support function 12, logical application 14, information types 16, technology policy 18, technical specification 20, and physical applications 22.

Business requirements 24 entered into system 26 via information screen 68 may be input by one or more users at one or more suitable input devices (e.g., a computer work station) until all business requirements 24 for a business have been defined. Thus, different groups of users having special knowledge of certain business requirements can enter information for those business requirements. For example, engineering users can enter business requirement information for all engineering related business requirements 24, whereas marketing representatives can enter information for all marketing related business requirements 24. Because the information from which each user can select has been previously named, defined, and entered by an informational manager or administrator, system 26 directs users to respond in a structured and organized environment. Consequently, names and definitions are consistent throughout. After information for all business requirements 24 have been received by system 26, the information can be combined, recompiled, and renumbered to generate a single set of defined business requirements 24 for the business.

Information screen 68 also functions to allow a user to view or modify information relating to a particular business requirement 24 after it has been entered and related to its associated core process support function 12, logical application 14, information types 16, technology policy 18, technical specification 20, and physical applications 22. Preferably, a specific business requirement 24 can be referenced by either its corresponding number appearing in business requirement number field 78 or its description appearing in business requirement description field 86. For referencing by name or description, system 26 may include a searching capability. All information relating to business requirement 24 may automatically appear in the other fields on information screen 68 once the business requirement has been selected from fields 78 or 86. The information can then be readily viewed or modified.

FIG. 4 illustrates an exemplary analysis report table 108 that may be generated by system 26 shown in FIG. 2. Analysis report table 108 comprises a plurality of columns including a business requirement column 110, a core process support function and logical application column 112, an information type column 114, a technical specification column 116, and a physical application column 118. For clarity, the information appearing in each of columns 110–118 in FIG. 4 is illustrated in generic terms (e.g., BUSINESS REQUIREMENT ONE, LOGICAL APPLICATION FOUR, INFORMATION TYPE THREE). It should be understood, however, that in an actual report, this information would appear in more specific terms.

Business requirement column 110 specifies one or more business requirements 24, by name, description, or corresponding business requirement number. Function column 112 specifies the core process support function 12 and logical application 14 associated with each business requirement 24 identified in column 110. More than one business requirement 24 may be associated with any particular core process support function 12 or logical application 14. For example, BUSINESS REQUIREMENTS ONE, THREE, and FOUR are associated with the FINANCE core process support function.

Information type column 114 specifies the information types 16 used by each business requirement 24 identified in column 110. Each business requirement 24 in column 110 may have different informational requirements. Some business requirements 24 may not manipulate or operate on any information, and no information type 16 is specified in column 114. For example, no information types 16 are specified for BUSINESS REQUIREMENTS THREE and EIGHT. Other business requirements 24 may manipulate or operate upon multiple information types 16, and more than one information type 16 may be specified in column 114. For example, INFORMATION TYPES TWO and FOUR appear in column 114 for BUSINESS REQUIREMENT TWO.

Technical specification column 116 specifies the different technical specifications for each business requirement appearing in column 110. Various business requirements 22 may be associated with more than one technical specification, and thus multiple technical specifications will appear in column 116. For example, TECHNICAL SPECIFICATIONS ONE and FOUR appear in technical specification column 116 for BUSINESS REQUIREMENT FOUR.

Physical application column 118 specifies any physical application 22 which can be used to perform a business requirement 24 appearing in column 110. Some business requirements 24 cannot be performed by any physical application 22, and consequently, no physical application is specified in physical application column 118. For example, no physical application 22 is specified in column 118 for BUSINESS REQUIREMENTS THREE and EIGHT. Other business requirements 24 can be performed by multiple physical applications 22, and multiple physical applications 22 appear in column 118. For example, PHYSICAL APPLICATIONS TWO and THREE are specified for BUSINESS REQUIREMENT TWO.

Analysis report table 108 provides a variety of information that can be used to associate a physical application 22 to a business operation. For example, table 108 indicates that various business requirements 24 use the same type of information (e.g., BUSINESS REQUIREMENTS ONE, FOUR, and SIX each use INFORMATION TYPE ONE). Consequently, when a computing environment is implemented, this information can be made available in a common database or multiple synchronized databases. Furthermore, analysis report table 108 indicates areas of overlap between physical applications 22. Specifically, if a business requirement 24 can be performed by more than one physical application 22, there is redundancy in a computing environment which includes all of the physical applications. Also, table 108 reveals gaps in coverage. In particular, if no physical application 22 is specified for a business requirement 24, then either the business requirement 24 must be performed manually or a physical application 22 that can perform the requirement should be added.

It should be understood that analysis report table 108 is exemplary only. Thus, another analysis report table may include other columns instead of, or in addition to, columns 110, 112, 114, 116, and 118. Preferably, system 26 may generate any of a variety of analysis reports according to various parameters, such as business requirement 24, "parent" business requirement, core process support function 12, logical application 14, information type 16, technology policy 18, technical specification 20, physical application 22, overlap, gap, or any other suitable parameter or combination of parameters. Furthermore, the reports can be in any of a variety of formats, such as a table, a graph, or any other suitable format for conveying information.

FIG. 5 is a flow chart of a method 200 for associating a physical application 22 to a business operation. Method 200 begins at step 202 where system 26, via first interface 28, receives and stores information relating to one or more core process support functions 12 and logical applications 14 relating to each core process support function 12. This information can be stored in function memory 30. System 26 also receives information specifying the various information types 16, technology policies 18, technical specifications 20, and physical applications 22 at steps 204–208, and this information can be stored in information type memory 34, technical memory 38, and product memory 42, respectively. The information relating to the core process support functions 12, logical applications 14, information types 16, technology policies 18, technical specifications 20, and physical applications 22 can be entered by an informational administrator or manager in order to set up system 26.

System 26 receives information relating to one or more business requirements 24 at step 210. In one embodiment, information for business requirements 24 is entered sequentially by various users using, for example, information screen 68 shown in FIG. 3. Each user may have a certain area of expertise, such as marketing or engineering. Using relator 48, system 26 generates linking information 52, such as pointers or indices, at step 212. Linking information 52 links each business requirement 24 with a core process support function 12, a logical application 14, an information type 16, a technology policy 18, a technical specification 20, and a physical application 22.

After the business requirement 24 has been linked or related to other information, system 26 stores the business requirement 24 in requirements memory 50 at step 214. In addition, all indices, pointers or links 52 generated by relator 48 may also be stored in requirements memory 50. System 26 queries whether the current business requirement 24 is the last business requirement 24 to be entered at step 216. If not, system 26 returns to step 210 where the next business requirement 24 is received at second interface 46. System 26 repeats steps 210–216 until information is collected for each business requirement 24 and pointers, indices or similar linking information 52 has been generated to relate the business requirements 24 to other information. Although the entry of business requirements 24 has been shown and described as a serial process, it should be understood that in another embodiment, business requirements 24 may be entered at multiple locations at one or more times and later compiled to establish business requirements 24 for a business operation.

System 26 queries whether a computing environment should be created from one or more physical applications 22 identified in product memory 42 at step 218. If an environment is to be created, system 26, via second interface 46, selects one or more physical applications 22 for a hypothetical computing environment at step 220. In response, system 26 generates environment information 58 comprising information which relates each physical application 22 within the created environment to various business requirements 24, core process support functions 12, logical applications 14, information types 16, technology policies 18, and technical specifications 20. System 25 stores the environment information 58 in environment memory 56.

System 26 generates a report at step 222. The parameters of the report can be defined by a user via second interface 46. Thus, system 26 can create an analysis report, such as exemplary analysis report table 108 shown in FIG. 4. In addition, system 26 may generate other reports, such as overlap and gap reports, for example, by the method described with reference to FIG. 6.

FIG. 6 is a flow chart of a method 300 by which system 26 compares physical applications 22 in a hypothetical computing environment with business requirements 24. Method 300 can be performed at step 222 in FIG. 5 to generate reports that identify overlaps and gaps in coverage of various business requirements 24.

Method 300 begins at step 302 where system 26 selects a business requirement 24. System 26 determines whether any physical application 22 performs the particular business requirement 24 at step 304. In one embodiment, system 26 considers each physical application 22 in the analysis. Alternatively, system 26 can be configured to consider only the portion of the physical applications 22 making up a particular hypothetical computing environment as indicated by environment information 58 stored in environment memory 56. If no physical application 22 performs the business requirement, system 26 includes the business requirement 24 in a gap analysis report at step 306.

System 26 determines whether multiple physical applications 22 perform the current business requirement 24 at step 308. If so, system 26 includes the business requirement 24 in an overlap analysis report at step 310. System 26 determines whether the current business requirement 24 is the last business requirement at step 312. If not, system 26 returns to step 302 where another business requirement 24 is selected. System 26 repeats steps 302–312 until each business requirement 24 specified in requirements information 52 has been analyzed.

The gap analysis performed according to method 300 identifies which business requirements 24 are not performed by any physical application 22. Consequently, system 26 can readily determine whether additional physical applications 22 are needed to automate such business requirements 24. The overlap analysis identifies business requirements 24 performed by multiple physical applications 22, thereby allowing system 26 to determine the redundancy between any two or more physical applications. Thus, if there is substantial redundancy between two physical applications 22, system 26 may select one application or the other, but probably not both, for use in a computing environment.

Although the present invention and its advantages have been described in detail, it should be understood that various changes, substitutions, and alterations can be made therein without departing from the spirit and scope of the invention as defined by the appended claims.

What is claimed is:

1. A system for associating a software physical application to a business operation, comprising:

a first database operable to store information relating to at least one software physical application;

an interface operable to receive information relating to at least one business requirement of the business operation;

a relator coupled to the first database and the interface, the relator operable to generate linking information to associate the business requirement to the software physical application; and a second database coupled to the relator, the second database operable to store the business requirement information and the corresponding linking information to associate the software physical application to the business operation.

2. The system of claim 1, further comprising a reporter coupled to the second database and operable to generate a report that includes the business requirement and its associated software physical application.

3. The system of claim 2, wherein the reporter is further operable to generate a computing environment by specifying a plurality of software physical applications.

4. The system of claim 1, wherein:

the first database is further operable to store information relating to at least one core process support function and at least one logical application;

the relator is further operable to generate linking information to associate the business requirement to the core process support function and the logical application; and the second database is further operable to store the linking information associating the business requirement to the core process support function and the logical application.

5. The system of claim 1, wherein:

the first database is further operable to store information relating to at least one technology policy and at least one technical specification;

the relator is further operable to generate linking information to associate the business requirement to the technology policy and the technical specification; and the second database is further operable to store the linking information associating the business requirement to the technology policy and the technical specification.

6. A method performed on a computer for associating software physical applications to a business operation, comprising the steps of:

receiving and storing information relating to at least one software physical application;

receiving information relating to at least one business requirement of the business operation;

generating linking information that associates the business requirement to the software physical application; and storing the business requirement information and corresponding linking information to associate the software physical application to the business operation.

7. The method of claim 6, further comprising the steps of:

receiving information relating to at least one core process support function and at least one logical application associated with the business requirement; and generating a portion of the linking information that associates the business requirement to the core process support function and the logical application.

8. The method of claim 6, further comprising the steps of:

receiving information relating to at least one technology policy and at least one technical specification of the business operation; and generating a portion of the linking information to associate the business requirement to the technology policy and the technical specification.

9. The method of claim 6, further comprising the steps of:

receiving information relating to at least one information type of the business operation; and generating a portion of the linking information to associate the business requirement to the information type.

10. The method of claim 6, further comprising the step of generating a gap analysis report comprising a list of business requirements that are not associated with the software physical application.

11. The method of claim 6, further comprising the step of generating an overlap analysis report comprising a list of business requirements that are associated with at least two software physical applications.

12. The method of claim 6, further comprising the steps of:

specifying a plurality of software physical applications that define a computing environment; and generating a gap analysis report comprising a list of business requirements that are not associated with any of the specified software physical applications.

13. The method of claim 6, further comprising the steps of:

specifying a plurality of software physical applications that define a computing environment; and generating an overlap analysis report comprising a list of business requirements that are associated with at least two of the specified software physical applications.

14. A data structure defining a business operation, comprising:

a first memory operable to store information relating to at least one software physical application; and a second memory operable to store information relating to at least one business requirement of the business operation, the second memory further operable to store linking information that associates the business requirement to the software physical application.

15. The data structure of claim 14, wherein:

the first memory is further operable to store information relating to at least one core process support function and at least one logical application; and the second memory is further operable to store a portion of the linking information that associates the business requirement to the core process support function and the logical application.

16. The data structure of claim 14, wherein:

the first memory is further operable to store information relating to at least one technical requirement in the business operation; and the second memory is further operable to store a portion of the linking information that associates the business requirement to the technical requirement.

17. The data structure of claim 16, wherein the technical requirement information comprises information relating to at least one technical specification and at least one technology policy of the business operation.

18. The data structure of claim 14, wherein:

the first memory is further operable to store information relating to at least one information type operated on during the performance of the function; and the second memory is further operable to store a portion of the linking information that associates the business requirement to the information type.

19. The data structure of claim 14, wherein for each business requirement the business requirement information comprises:

a business requirement number;

a textual description of the business requirement; and a priority for the business requirement.

* * * * *